United States Patent
Fryer

[15] 3,648,925
[45] Mar. 14, 1972

[54] ANIMAL SLAPPER

[72] Inventor: Donald E. Fryer, 3208 Oxford Drive, Bettendorf, Iowa 52722

[22] Filed: Dec. 22, 1969

[21] Appl. No.: 887,166

[52] U.S. Cl. ................................................231/2 R, 119/29
[51] Int. Cl. ..........................................................B68b 11/00
[58] Field of Search ...................46/191; 119/29, 1; 231/2; 273/67

[56] References Cited

UNITED STATES PATENTS

| 2,678,158 | 5/1954 | Arant | 231/2 R |
|---|---|---|---|
| 3,227,362 | 1/1966 | Laten | 231/2 E |
| 3,170,360 | 2/1965 | Miettinen | 46/191 x |
| 2,645,488 | 7/1953 | Jorgenson | 273/67 |
| 3,059,375 | 10/1962 | Tischer | 46/191 |

*Primary Examiner*—Aldrich F. Medbery
*Attorney*—Greist, Lockwood, Greenawalt & Dewey

[57] ABSTRACT

An animal slapper including a handle portion and a slapper portion. The slapper portion is made from a flexible rubber-like material and has a generally flat rectangular or paddle-like configuration. Preferably, the slapper portion is made from one or more plies of a flexible fiber reinforced rubber or rubber-like material, e.g., a polychloroprene (Neoprene) material.

9 Claims, 3 Drawing Figures

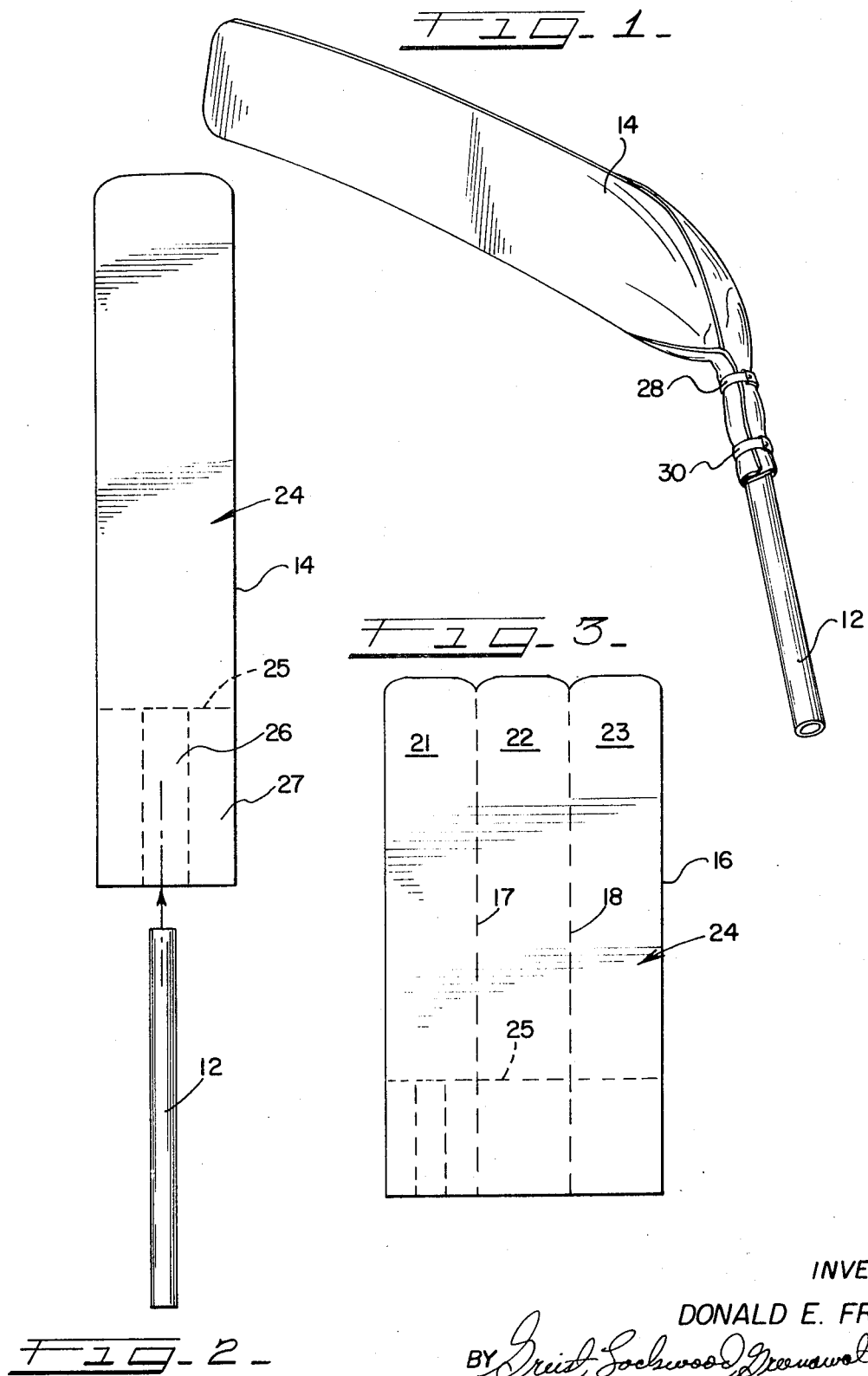

ANIMAL SLAPPER

The present invention generally relates to an improved animal slapper of the type utilized in herding animals. More particularly, the present invention relates to an animal slapper for herding livestock from pen-to-pen in stockyards, meat packing plants or the like.

In the processing of livestock, such as cows, pigs, and sheep, through a slaughtering plant, it has long been the practice to use animal slappers for herding the livestock through the plant to the kill-floor with a minimum of injury to the carcass. For a long time, canvas animal slappers have been used for this purpose. Such canvas slappers are formed with a piece of canvas clamped or secured onto the end of a wooden handle. These canvas slappers have been effective in causing the livestock to move through the slaughtering plant. However, a significant amount of bruising of the animal tissue was incurred when utilizing canvas slappers for moving livestock through the slaughtering plant, particularly when the canvas slapper portion became wet and heavy. This bruising of the animal tissue resulted in a loss or down-grading of the useable meat obtained from the animal.

Additionally, the normal useful life of a canvas slapper has not been more than a few days. In view of the fact, attempts have been made to increase the useful life of an animal slapper by making the slapper portion from heavy machine belting or leather straps. However, these animal slappers have met with only limited success since, although the useful life of the slapper was somewhat increased, a significant reduction in bruise loss was not obtained with these slappers, and in some instances, the bruise loss was increased.

In view of the above deficiencies incurred with prior art animal slappers the present invention provides a new and improved animal slapper having a rigid handle portion and a slapper portion made from a water resistant, durable, lightweight, resilient material. It has been found that one material which has these properties and which therefore finds advantageous use as a slapper portion of an animal slapper is a fiber reinforced polychloroprene rubber material such as the type sold under the trade name Neoprene. Other synthetic rubbers and plastics as well as natural rubber having similar physical properties also may be used.

Accordingly, a general object of the present invention is the provision of a durable animal slapper which bruises an animal very little, if at all, when used in herding an animal through a slaughtering plant.

Another object of the present invention is the provision of a water resistant animal slapper.

Another object of the present invention is the provision of a lightweight animal slapper having a flexible resilient rubberlike slapper portion.

Another object of the present invention is the provision of an animal slapper having a reusable lightweight handle portion.

Another object of the present invention is the provision of an animal slapper in which the slapper portion is secured to the handle portion by at least one clamp which can be easily removed to permit reuse of the handle portion.

Still another object of the present invention is the provision of an animal slapper having a metal handle portion and a slapper portion made from one or more plies of a polychloroprene rubber material.

These and other objects and advantages of the present invention, and the manner of their attainment, will become more apparent from the following description of a preferred embodiment of the present invention taken in conjunction with the accompanying drawings wherein:

FIG. 1 is a perspective view of one preferred embodiment of an animal slapper forming one embodiment of the present invention;

FIG. 2 is a plan view of the animal slapper shown in FIG. 1 before the slapper portion is secured to the handle portion; and, FIG. 3 is a plan view of the slapper portion shown in FIG. 2 before it is folded over to form a three ply slapper portion.

Referring now to the drawings in greater detail, the animal slapper of the present invention is generally indicated at 10 in FIG. 1 and includes a handle portion 12 and a slapper portion 14. Preferably, the handle portion 12 is made from aluminum conduit which is inexpensive, rigid, lightweight and long-wearing and therefore reuseable after the slapper portion 14 has worn out.

In accordance with the teachings of the present invention, the slapper portion 14 is made from a rubberlike material which is durable, lightweight, water resistant, flexible and resilient, and which has sufficient body to retain its shape and yet is sufficiently flexible and resilient so it will not bruise the animal tissue when properly used.

It has been found that one type of material which exhibits the properties and characteristics described above is a fiber reinforced rubberlike material. Thus, in accordance with the teachings of the present invention, the slapper portion 14 is preferably made from one or more plies of such a material, one preferred material being a fiber reinforced polychloroprene rubber material such as the type sold under the trade name Neoprene.

As shown in FIG. 2, the slapper portion 14 has a flat, generally rectangular paddle-like shape providing a sufficient "paddle" or "slapping" area so that a slapping force applied to an animal is sufficiently distributed throughout the slapped area. In this way, bruising of the animal tissue is reduced, not only by making the slapper portion 14 from the preferred material described above, but also by making the slapper portion sufficiently large for distributing a slapping force applied with same.

To ensure sufficient stiffness or body to the slapper portion 14 so the "slapping" area will be flat when it engages an animal, one preferred form of the slapper portion 14 is formed from three plies of a fiber reinforced polychloroprene material. As shown in FIG. 3, this preferred form of slapper portion is formed from one piece of material 16 which is folded over twice to form a three ply slapper portion 14. In other words, the piece of material 16 is folded on the fold lines 17 and 18 to form three plies 21, 22 and 23 which are permanently secured together in the area 24 above the broken line 25 by a suitable moisture-resistant adhesive of known commercial type.

A portion 26 of the area 27 of the plies 21, 22 and 23 below the broken line 25 is left unadhered so that the handle portion 12 can be inserted between two of the plies 21, 22 and 23 in the unadhered area 26 as best shown in FIG. 2. It will be appreciated that by securing the plies together substantially throughout the area between plies, the slapper portion 14 is prevented from sliding down on the handle portion 12. After the handle portion 12 is inserted between two plies, the plies 21, 22 and 23 are folded over the handle portion 12 and secured thereto by suitable fastening means, such as two "-punch-lok" clamps 28 and 30 as shown in FIG. 1. Preferably, the clamps 28 and 30 are of a type which can be easily removed for replacing a worn out slapper portion.

A working model of an animal slapper constructed according to the teachings of the present invention included a 16 inch long handle portion made of a five-eighths inch inner diameter aluminum conduit. The slapper portion was formed of three plies of a fiber reinforced polychloroprene material and had a rectangular shape 30 inches long and 6 inches wide. The unadhered portion of the plies was approximately 7½ inches long for receiving approximately 7½ inches of the handle portion into the lower end of the slapper portion 14.

The polychloroprene material used was 0.020 (avg.) inches thick and comprised:

67½ parts by weight polychloroprene and, 32½ parts by weight of 100 percent nylon fibers at about 40 threads per square inch.

The key physical properties of this material are as follows:

Tensile strength, p.l.i.
2 (per linear inch)      450 Warp × 400 Fill
Elongation at break %      31%

It should be noted however, that other rubberlike materials having similar physical properties also can be utilized for the slapper portion.

In a comparative test with a conventional canvas animal slapper, the above described working model of an animal slapper constructed according to the teachings of the present invention, not only lasted much longer (e.g., 2 to 3 months) than the conventional canvas slapper (2 to 3 days), but also caused considerably less bruising to animal tissue than did the conventional canvas slapper. As a result, the annual savings obtainable through reduction in bruise loss at a single slaughtering plant may run into the tens of thousands of dollars utilizing an animal slapper constructed according to the teachings of the present invention.

Moreover, this new and improved animal slapper is much lighter to use than a conventional canvas slapper. Additionally, by securing the slapper portion 14 to the handle portion 12 with "punch-lok" clamps and by forming the handle portion from a durable, water resistant metal, such as aluminum, the handle portion 12 can be reused many times.

While the present invention has been described herein with reference to a preferred embodiment of the invention which utilizes a slapper portion made from three plies of a fiber reinforced polychloroprene material, it is to be understood that the slapper portion can be formed of one or more plies of other materials which exhibit the same or similar physical characteristics and properties as the preferred polychloroprene material. Accordingly, the scope of the present invention is only to be limited as necessitated by the accompanying claims.

I claim:

1. An animal slapper device comprising a handle portion and an oblong flexible slapper portion, said slapper portion comprising a multi-ply folded sheet including a large area animal contacting portion on one end having the plies in over laying relation, and a small area handle contacting portion on the other end, said plies on said small area end being secured together to each other and further wrapped around and enclosing one end of said handle portion so that when said slapper is swung against an animal, the slapping force is applied to the animal and distributed over a relatively large skin area so little or no underlying animal tissue is bruised.

2. An animal slapper as defined in claim 1 in which said sheet is fiber reinforced.

3. An animal slapper as defined in claim 1 in which said sheet material is a fiber reinforced polychloroprene rubber material.

4. An animal slapper as defined in claim 1 wherein said one end of said slapper portion has a pocket into which one end of said handle portion is received and then secured to said one end of said slapper portion.

5. An animal slapper as defined in claim 1 wherein said slapper portion is made from a rubberlike material having at least the following physical properties:

| | |
|---|---|
| Tensile strength, per linear inch | 450 warp × 400 fill |
| Elongation at break % | 31% |

6. An animal slapper as defined in claim 1 wherein said sheet is approximately 0.020 inches thick.

7. An animal slapper as defined in claim 1 wherein said flexible sheet is a sheet of fiber reinforced polychloroprene material which is approximately 0.020 inches thick and which comprises approximately 67½ parts by weight polychloroprene and approximately 32½ parts by weight of 100 percent nylon fiber threads at about 40 threads per square inch, and said sheet of polychloroprene material is folded over to form said slapper portion with three plies of said polychloroprene material.

8. An animal slapper as defined in claim 1 in which said sheet is of rubberlike material and is folded over to form said slapper portion with three plies of said rubberlike material.

9. An animal slapper as defined in claim 1 wherein one end of said slapper portion is folded over and clamped to one end of said handle portion.

* * * * *